April 5, 1960          J. J. RICHARDS          2,931,735
METHOD OF MARKING GRADUATED GLASS CLINICAL THERMOMETERS
Filed March 5, 1956          2 Sheets-Sheet 1
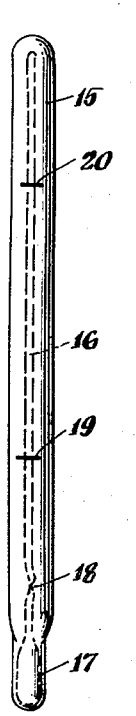
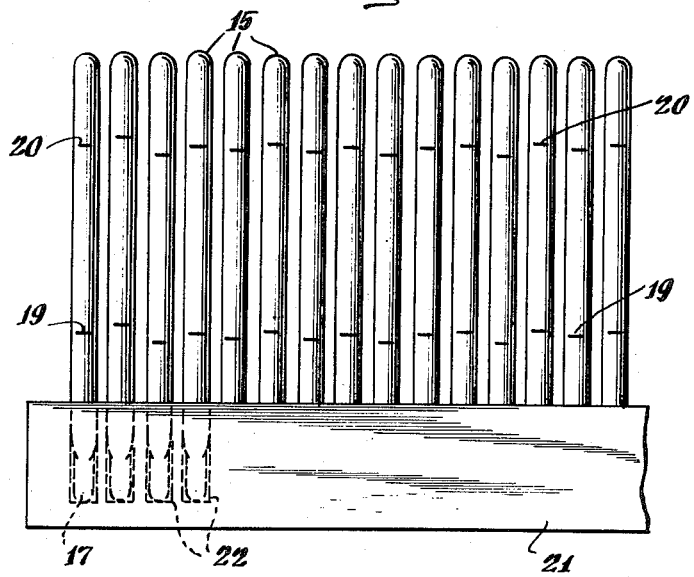
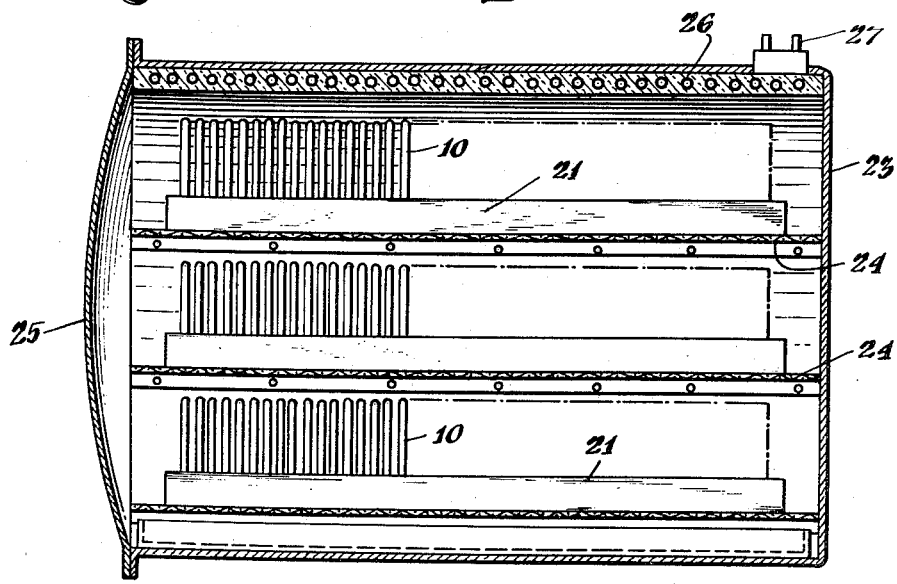
INVENTOR
John J. Richards
BY
Kane, Dalsimer and Kane
ATTORNEYS April 5, 1960     J. J. RICHARDS     2,931,735
METHOD OF MARKING GRADUATED GLASS CLINICAL THERMOMETERS
Filed March 5, 1956     2 Sheets-Sheet 2
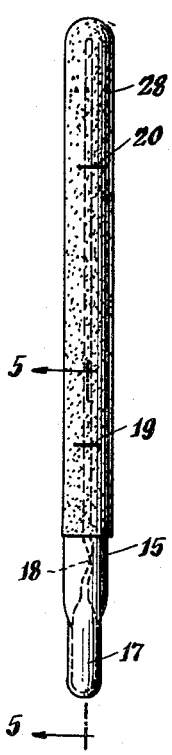
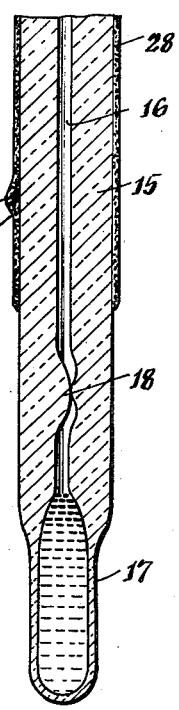
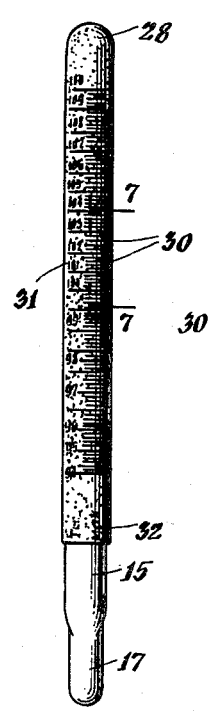
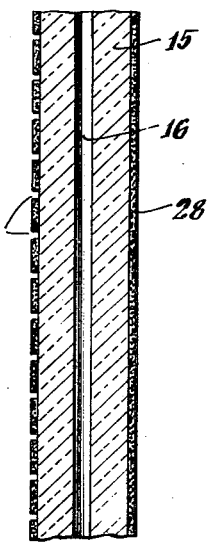
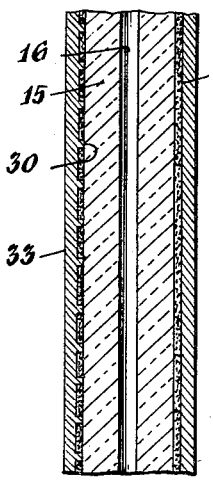
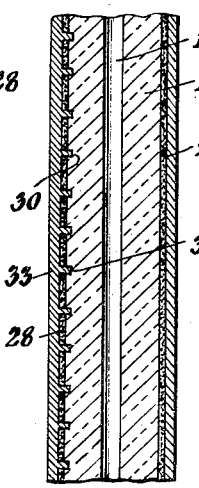
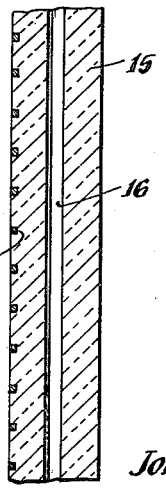
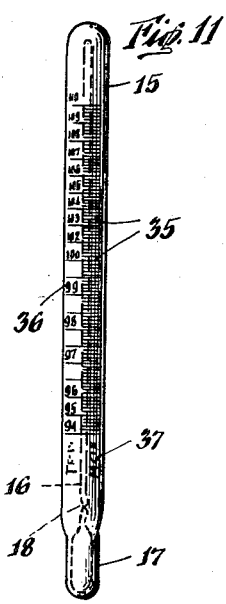
INVENTOR
John J. Richards
BY
Kane, Dalsimer and Kane
ATTORNEYS United States Patent Office 2,931,735
Patented Apr. 5, 1960

2,931,735

METHOD OF MARKING GRADUATED GLASS CLINICAL THERMOMETERS

John J. Richards, Wyckoff, N.J., assignor to Becton, Dickinson and Company, Rutherford, N.J., a corporation of New Jersey Application March 5, 1956, Serial No. 569,427

5 Claims. (Cl. 117—5.5)

This invention relates to a novel method of marking glass articles and, in its more specific aspects, is directed to the manufacture of thermometers of the clinical type.

By means of the present teachings, a method is provided which may be practiced by a person of ordinary skill to provide in an improved manner, graduations and/or indicia in association with a glass article, in a manner such that the data so applied will remain in permanent association with the article and legible throughout the entire effective life of the latter to thus provide an improved clinical thermometer.

A further object is that of relating such a method to the manufacture of thermometers and especially clinical thermometers so that the latter may be subjected to the action of cleaning agents and also subjected to sterilization without impairing the legibility of the data applied to the thermometer assembly; the present teachings largely overcoming the difficulties heretofore experienced in the attempted permanent application of graduations and indicia to those surfaces.

In the annexed drawings and subsequent specification, the invention will be described as being practiced in connection with the manufacture of thermometers and specifically clinical thermometers. It may be generally stated that practice is in many respects the most exacting. Also, the invention herein is primarily directed to the production of improved clinical thermometers. However, except where otherwise indicated in the appended claims, it is to be understood that the drawings and following description are to be taken in an illustrative rather than a limiting sense.

Thus, referring to the drawings:

Fig. 1 is a front elevation of a clinical thermometer after it has been "pointed";

Fig. 2 is a fragmentary view of a holder supporting a number of thermometers;

Fig. 3 is a somewhat diagrammatic sectional side view of a metallizing apparatus used in connection with the practice of the present method;

Fig. 4 is a view similar to Fig. 1 but showing the thermometer after it has emerged from the step achieved by the use of the apparatus illustrated in Fig. 3;

Fig. 5 is a fragmentary enlarged sectional side view taken along the line 5—5 in the direction of the arrows as indicated in Fig. 4;

Fig. 6 illustrates the thermometer assembly after it has been marked in a suitable manner or engraved to include the desired graduations and indicia;

Fig. 7 is a fragmentary sectional view taken along the line 7—7 in the direction of the arrows as indicated in Fig. 6;

Fig. 8 is a view similar to Fig. 7 but illustrating the section of the stem after it has been coated with staining material;

Fig. 9 is a view similar to Fig. 8 and schematically showing the "exchange" step which occurs when the stem with the coating applied thereto is subjected to heat treatment of proper duration and intensity;

Fig. 10 illustrates a section of the stem after the removal of the metal and residue of the stain coating; and Fig. 11 is a front elevation of a completed thermometer produced in accordance with the present teachings.

As will be understood, a screen process or similar method of providing indicia on glass articles may not be employed in connection with a series of clinical thermometers. This is because each thermometer has its own individual structural characteristics. Therefore, it is found that with two otherwise identical thermometers, the height of the thermally responsive agent or liquid (usually mercury) within the bore of the thermometer stem will, under identical temperatures, extend in the different thermometers to different levels. Therefore, it is necessary to precisely determine the characteristics individual to a given thermometer assembly and to calibrate and relate the graduations designating temperature values to these characteristics. Obviously, the limitations inherent to use of a screen process prohibits its application to a series of such thermometers.

In the practice of the present invention, thermometers are produced in any desired and acceptable manner. They will include, in each instance, a stem having a bore of the capillary type with the stem sealed at its upper end and a bulb at its lower end. That bulb will contain a thermally responsive agent, such as mercury, which under increase in temperature will elevate within the evacuated bore of the unit. Also, a restriction will be included within the bore and adjacent the bulb. This restriction will permit of the thermally responsive agent passing beyond it and rising within the bore. However, thereafter, the restriction will maintain the mercury or other agent in the position into which it has been elevated so that an observer may perceive the limit of the rise after the bulb of the thermometer has been removed from association with the heat source. Subsequently, and by suitably shaking or otherwise manipulating the thermometer, the thermally responsive agent may be caused to retreat to a position where it is wholly contained within the bulb and zone of the stem adjacent the restriction. For the purpose of considering the present teachings, it is immaterial what precise structure is embraced within the thermometer. However, in accordance with the disclosure of my prior application filed in Washington on May 24, 1954, under Serial No. 431,749, and identified as "Method of Manufacturing Clinical Thermometers and Preform Therefor," it is intended that all clinical thermometers availing themselves of the present method have their bodies subjected to a degassing operation. An effective temperature of from 740° F. to 760° F. will prevail under high vacuum conditions of, for example, 0.01 micron. This step is conveniently continued for 24 or more hours.

By that procedure, all vapors emanating either from the constituents of the glass compound providing the thermometer body, or from moisture or other foreign materials are in effect completely eliminated. With the elimination of gas or vapor it is feasible to resort to the subsequent teachings herein without fear that these will result in a thermometer which will be inaccurate or have "retreating" characteristics. After this treatment, the steps necessary to the manufacture of a complete thermometer are resorted to without gas being formed. This results in a unit of the type illustrated in Fig. 1 herein.

In that view, the numeral 15 indicates the thermometer stem which may embrace any desired configuration and which will be formed of a suitable glass compound such that tubing of the capillary type is furnished. That tubing will embrace a bore 16 which is sealed adjacent the upper or outer end of the stem. At its opposite end, the thermometer will present a bulb 17. The latter receives a body of mercury of maximum purity which is also subjected to high vacuum action as taught in my earlier application. Other thermally responsive liquids may in certain instances be used. Adjacent the bulb, bore 16 is formed with a constriction, generally indicated at 18 and past which the mercury may flow as aforedescribed.

It is apparent that each thermometer assembly embodying these structures will have its own individual characteristics. In other words, the diameter of bore 16 may vary within certain limits in different thermometers. The same is true of the capacity of bulb 17. Also, the restriction 18 will embrace surfaces defining the desired passage and which surfaces minutely vary in two thermometers which, to the casual observer, are identical. Incident to these variations, it is apparent that the thermally responsive agent will rise in different thermometers to dissimilar heights under exposure of the bulbs to identical temperatures. Therefore, the units are subjected to known temperatures which may, for example, be 96° F. and 106° F. respectively. The height of the upper surface of the column of mercury or its equivalent is noted under these conditions, and marks such as 19 and 20 respectively are applied to the stem in registry with the upper surface of the column. This is known as "pointing" the thermometer and serves to accurately indicate the usual extremes of registry range characteristic to a particular unit. The marks 19 and 20 are applied by employing, for example, an ink or a pigment.

After a number of these units are produced, they are assembled in a holder. This, as shown in Fig. 2, may include a body 21 formed with a series of recesses 22. The diameters of the latter are such that they may receive the bulb ends of the thermometers. Accordingly, the holder will house and protect the areas of the units which are adjacent the bulbs. As indicated in Fig. 2 in a somewhat exaggerated manner, points 20 and 19 in adjacent thermometer units are in a number of different vertical planes. It is apparent that where a holder of this general type is employed, a large number of thermometers may be handled and transported as a group.

In practicing the present invention, the stems of the thermometers receive a coating. That coating might embrace one of a number of different materials including suitable plastic of a preferably transparent nature. However, it will ordinarily be desired to employ a coating of metal such as aluminum. To this end, vacuum metallizing is resorted to. This will necessitate the employment of an apparatus of the type somewhat diagrammatically shown in Fig. 3.

In that view, the numeral 10 indicates thermometers supported within holders such as 21. A suitable receptacle has been indicated at 23 and has within its body trays or supporting portions 24 to receive the holders 21. A cover 25 is associated with receptacle 23. A suitable heat source such as 26 may be energized by means of the flow of electrical current through supply leads connected to fitting 27. As is understood, a condition of vacuum is created within casing 23. Thereupon, by exposing within that casing elements of, for example, aluminum to extremely high heat, a layer of that material is vaporized. It is deposited on those portions of the thermometer stems exposed beyond the holders.

A coating of aluminum deposited in this manner will be extremely thin. It may have a thickness on the order of seven to eleven one-millionths of an inch. This coating will be applied while the units are in the vacuum metallizing apparatus.

As shown in Fig. 4, that coating has been indicated at 28. It conveniently extends from a point adjacent or immediately above the constriction 18 through to the outer ends of the stem tips. It will be borne in mind that the points established by the marks 19 and 20 incident to the use of a suitable pigment or ink may have a thickness or height of one-thousandth of an inch or more. Accordingly, as in Fig. 5, coating 28 having only a fractional thickness will be raised in line with these pointing marks as indicated at 29 so that the zones of the same will be readily perceptible to an operator viewing the exterior surface of that coating. Therefore, correlating the elements of a proper calibrating apparatus to these points, it will be entirely feasible to establish the necessary data embracing graduations and indicia intervening marks 19 and 20 as well as extending beyond the same.

This result is achieved by employing an engraving machine of acceptable construction and which will utilize knife elements for the establishment of scale or graduation marks and needle elements which will provide for words, numbers, trademarks or other desired indicia. Accordingly, and as illustrated especially in Fig. 6, the coating 28 will be interrupted to provide outlines 30 furnishing graduation marks for a scale, interruptions such as 31 furnishing numerals adjacent thereto and interruptions 32 providing for indicia such as trademarks, type marks and otherwise. This effect has been illustrated in enlarged scale in Fig. 7 in which the coating has been shown as being interrupted at 30 to furnish the scale marks; similar interruptions furnishing the outline of the desired data or indicia and all of the interruptions extending through to the outer face surface of the stem 15 or equivalent portion.

With the assembly in this condition, a stain is applied in any suitable manner to the exterior of coating 28 as shown in Fig. 8. That stain has been indicated at 33 as a layer overlying the coating. As also shown in that figure, the stain is caused to extend through the openings 30 into direct contact with the outer surface of stem 15 or other parts of the assembly. Various types of coating may be employed. For example, salts embracing silver or copper oxide or other proper material may be utilized. As afore brought out, this coating will extend through into direct contact with the surface of the glass.

Either at this time or prior to engraving, the thermometers are subjected to a shaking or centrifugal action such that the thermally responsive agent (preferably mercury) is confined substantially to the bulb end of the thermometer. Under these circumstances, the entire body of the agent may be below the constriction 18 or else extend merely a short distance above the same. The bulbs 17 of the units are cooled in any desirable manner to maintain the expansible agent in retracted condition. The stems 15 embracing those portions of the units which are beyond the restrictions are disposed within a heating element or oven. In the latter unit, the stems and the coating 33 are subjected to a temperature range of approximately 700° F. to 725° F. for a period of around fifteen minutes. This temperature is, of course, less than that which obtains during the initial degassing of the units or the vapor plating operation. Therefore, there will be no danger of the units or their components giving off vapors which would destroy the effectiveness of the thermometers. Also, due to the fact that coating 28 terminates at a point short of bulb 17, there will be no heat transmission to the latter by the coating which will ordinarily be heat conductive.

With the stems subjected to this temperature range, it is found that a reaction occurs involving an exchange of ions embraced within coating 33 for sodium ions in the glass body 15. If, for example, coating 33 embraced a paste involving a silver salt, the stem 15, after the baking operation, will have embodied in it lines clearly contrasting to its body and the tint of which will vary according to the concentration of the stain employed and/or the time or temperature of the baking operation. The contrast will be provided by a tinted layer which will be microscopically thin, but will actually comprise an integral part of stem 15 without any increase in dimension of the latter rather than being in the nature of a coating or layer overlying the same. This has been illustrated at 34 in Fig. 9 in which the ion exchange has been exemplified by a penetration of the surface of the stem by those portions of the stain layer 33 which project through the zones of interruption 30 embraced within coating 28.

In the event that coating 33 be provided of plastic or similar material, it is of course obvious that under the baking operation, it will char or dissolve incident to the high oven temperatures. In that case, residues of the coating 33 may after cooling be removed by simply wiping the stem of the unit. If, according to the preferred aspect of the invention, a metallizing coating such as aluminum is employed, it will, of course, not be affected detrimentally by the temperature of the oven. In that case, it may be removed by, for example, employing a solution of caustic soda. Immersion of the stem within the latter will result in a dissolving of the metallizing coating. Thereafter, the stem may be washed to present the appearance illustrated in Fig. 10.

This will leave, as in Fig. 10, a stem 15, the surface of which is entirely smooth. Embedded within the stem by the ion exchange will be lines contrasting in color from the stem and providing graduations or other marks corresponding to the data heretofore identified under the numerals 30, 31 and 32. Lines indicative of this data have been shown in Fig. 10 by the reference numeral 34. The thermometer will now be ready for certification.

The finished device has been shown in Fig. 11. In that view the several components of the unit as heretofore described have been indicated by the reference numerals as previously used. Additionally, the ion exchange has resulted, in the case of a thermometer of the clinical type, in a scale or lines of graduation 35 extending transversely of bore 16 as well as indicia in the nature of numerals 36 according temperature valuations to those lines. Moreover, serial numbers, trademarks or other data as indicated at 37 have been provided by the stain which was applied and subjected to the proper temperature for the necessary time interval so that an ion exchange has resulted. All of this data may be subjected to the action of various agents and conditions involved in the cleaning and sterilizing of the thermometers as resorted to in hospitals and the offices of physicians, without this in any manner affecting the initial contrast or legibility incorporated in the assembly. Due to the fact that the stain will not tend to spread over the surface of the stem, the data or indicia will be sharply defined and free from all blurs or other objectionable characteristics.

As will be understood, the same procedure involving the providing of the desired contrast may be resorted to in numerous associations involving glass articles. For example, syringe barrels and graduates may thus have incorporated in them desired markings. However, the invention is especially applicable to thermometers and particularly clinical thermometers.

Thus among others, the several objects of the invention as specially aforenoted are achieved. It is obvious that the steps of the method may be varied in numerous particulars and that apparatus as well as materials other than those herein specifically set forth may be employed in the practice of the invention without departing from the spirit of the latter as defined by the claims.

I claim:

1. A method of providing permanent and positive scales on and flush with the surface of stems forming parts of clinical thermometers, said method including subjecting a thermometer to sufficiently elevated and different definite temperatures to cause the thermally responsive liquid within its bulb to rise within the stem bore and assume certain elevated positions within that bore to points individual to that thermometer, marking these points upon the surface of the stem, coating the stem with a layer of covering material in a manner such that the point markings will be visible in that coating, engraving a scale related to those markings so as to extend at least between the points, by cutting through such coating to expose the glass stem surface in desired and predetermined outline, applying a metallic salt to overlie said coating and extend through the engraved outline therein into contact with the glass, and subjecting the stained coated stem to heat of a sufficient intensity to cause an ion exchange to occur between the stain and glass such that the scale appears flush upon and below the stem surface.

2. In a method as defined in claim 1, the marking of the points upon the stem occurring by the use of a material, such as a pigment, which will present sufficient body to cause a raising of the coating layer in line with those points.

3. In a method as defined in claim 1, said covering material embracing a coating of metal.

4. In a method as defined in claim 3, that coating terminating at a point short of the thermometer bulb, and the final step of removing undesired residues of stain and coating from the surface of the stem.

5. In a method as defined in claim 1, a step in the formation of the thermometer prior to the procedure outlined in claim 1, involving a degassing operation by exposing the thermometer parts to an elevated temperature, and the temperature resulting in the ion exchange being of lower intensity than such degassing temperature.

References Cited in the file of this patent

UNITED STATES PATENTS

| | | |
|---|---|---|
| 1,391,878 | Chaney | Sept. 27, 1921 |
| 2,447,836 | Beeber et al. | Aug. 24, 1948 |
| 2,505,411 | Kolodny et al. | Apr. 25, 1950 |
| 2,612,002 | Thompson et al. | Sept. 30, 1952 |
| 2,699,670 | Becton | Jan. 18, 1955 |
| 2,712,237 | Margolis | July 5, 1955 |